(12) United States Patent
Labrecque et al.

(10) Patent No.: US 11,178,852 B2
(45) Date of Patent: Nov. 23, 2021

(54) MONITORING LIVESTOCK

(71) Applicant: Groupe Ro-Main Inc., St. Lambert-de-Lauzon (CA)

(72) Inventors: Jacquelin Labrecque, St-Bernard (CA); Frank Gouineau, Levis (CA); Pierre Savatte, Pays-de-la-Loire (FR); Dimitri Estrade, Levis (CA); Joel Rivest, Quebec (CA)

(73) Assignee: Groupe Ro-Main Inc., St. Lambert-de-Lauzon (CA)

( * ) Notice: Subject to any disclaimer, the term of this patent is extended or adjusted under 35 U.S.C. 154(b) by 107 days.

(21) Appl. No.: 16/560,299

(22) Filed: Sep. 4, 2019

(65) Prior Publication Data

US 2020/0125849 A1   Apr. 23, 2020

Related U.S. Application Data

(60) Provisional application No. 62/848,942, filed on May 16, 2019, provisional application No. 62/748,774, (Continued)

(51) Int. Cl.
*G06K 9/00* (2006.01)
*A01K 29/00* (2006.01)
(Continued)

(52) U.S. Cl.
CPC .......... *A01K 29/005* (2013.01); *A01K 1/0209* (2013.01); *A01K 1/0218* (2013.01);
(Continued)

(58) Field of Classification Search
CPC .. A01K 29/005; A01K 11/001; A01K 11/006; A01K 1/0209; A01K 1/0218;
(Continued)

(56) References Cited

U.S. PATENT DOCUMENTS

| 5,050,537 A | 9/1991 | Fox |
| 5,416,330 A | 5/1995 | Abul-Faraj |

(Continued)

FOREIGN PATENT DOCUMENTS

| CA | 2908329 | 10/2014 |
| CA | 2989258 | 1/2017 |
| KR | 101806521 | 12/2017 |

*Primary Examiner* — Tom Y Lu
(74) *Attorney, Agent, or Firm* — Adrian D. Battison; Ade & Company Inc.; Kyle R. Satterthwaite

(57) ABSTRACT

An apparatus for raising livestock includes one or more confinement pens together with alleyways for transfer of the animals from one location to another. The apparatus includes one or more cameras for obtaining images of all animals in the containment area. A processor is provided for analyzing the images, the processor being arranged to allocate an arbitrary identification to each animal and to track all animals continually to maintain the allocation. From this tracking various data related to individual animals or the animals as a group can be obtained to assess their characteristics and to provide an indication to the worker of the animal to be extracted. The processor can be arranged to detect by image analysis of the image a quantity of feed and/or water in a feeder and to obtain images of the farrowing pen including the sow confinement area and at least one piglet confinement area.

10 Claims, 8 Drawing Sheets

Related U.S. Application Data filed on Oct. 22, 2018, provisional application No. 62/746,790, filed on Oct. 17, 2017.

(51) Int. Cl.
| | |
|---|---|
| *A01K 11/00* | (2006.01) |
| *A01K 1/02* | (2006.01) |
| *A01K 7/06* | (2006.01) |
| *G06T 7/00* | (2017.01) |
| *G06Q 10/08* | (2012.01) |
| *A01K 5/02* | (2006.01) |
| *G06T 7/70* | (2017.01) |
| *A01K 1/08* | (2006.01) |
| *G06T 7/20* | (2017.01) |
| *G10L 25/51* | (2013.01) |
| *H04N 5/225* | (2006.01) |
| *H04N 7/18* | (2006.01) |
| *H04L 29/06* | (2006.01) |

(52) U.S. Cl.
CPC .............. *A01K 1/08* (2013.01); *A01K 5/02* (2013.01); *A01K 7/06* (2013.01); *A01K 11/001* (2013.01); *A01K 11/006* (2013.01); *G06K 9/0063* (2013.01); *G06K 9/00362* (2013.01); *G06K 9/00671* (2013.01); *G06Q 10/087* (2013.01); *G06T 7/0008* (2013.01); *G06T 7/20* (2013.01); *G06T 7/70* (2017.01); *G10L 25/51* (2013.01); *H04N 5/2253* (2013.01); *H04N 7/18* (2013.01); *H04L 65/60* (2013.01)

(58) Field of Classification Search
CPC ... A01K 1/08; A01K 5/02; A01K 7/06; G06K 9/00362; G06K 9/0063; G06K 9/00671; G06K 9/00771; G06K 9/18; G06Q 10/087; G06T 7/0008; G06T 7/20; G06T 7/70; G10L 25/51; H04L 65/60; H04N 5/2253; H04N 7/18; H04N 5/2257; H04N 7/181

See application file for complete search history.

(56) References Cited

U.S. PATENT DOCUMENTS

| | | |
|---|---|---|
| 5,474,085 A | 12/1995 | Humik |
| 6,032,084 A | 2/2000 | Anderson |
| 6,216,053 B1 | 4/2001 | Cureton |
| 7,447,334 B1* | 11/2008 | Jiang .................. G06K 9/00362 348/143 |
| 7,843,350 B2 | 11/2010 | Geissler et al. |
| 8,915,215 B1 | 12/2014 | Helgeson |
| 9,058,657 B2* | 6/2015 | Hofman ............... A01K 29/005 |
| 2002/0116200 A1 | 8/2002 | Cureton |
| 2004/0141636 A1* | 7/2004 | Liang .................. A61B 5/1128 382/110 |
| 2006/0112904 A1* | 6/2006 | Davis Mollhagen ........................ A01K 15/003 119/843 |
| 2006/0201432 A1* | 9/2006 | Pratt ....................... H04B 7/26 119/51.02 |
| 2007/0137584 A1 | 6/2007 | Travis |
| 2008/0212099 A1* | 9/2008 | Chen ................ G08B 13/19608 356/408 |
| 2009/0288606 A1 | 11/2009 | Zimmerman |
| 2010/0289639 A1 | 11/2010 | Gibson |
| 2011/0192213 A1 | 8/2011 | Zimmerman |
| 2013/0340305 A1 | 12/2013 | Mobley |
| 2015/0109130 A1 | 4/2015 | Rajkondawar |
| 2016/0029592 A1 | 2/2016 | Springer |
| 2016/0066546 A1 | 3/2016 | Borchersen |
| 2016/0219831 A1 | 8/2016 | Van Den Berg et al. |
| 2016/0363692 A1 | 12/2016 | Arpin |
| 2017/0142937 A1 | 5/2017 | De Groot |
| 2017/0202185 A1 | 7/2017 | Trumbull |
| 2018/0116166 A1 | 5/2018 | Van Den Berg |
| 2018/0160649 A1 | 6/2018 | Hicks |
| 2019/0281799 A1 | 9/2019 | Sassmannshaus |
| 2019/0380311 A1 | 12/2019 | Crouthamel |
| 2019/0385332 A1 | 12/2019 | Yajima |
| 2020/0143157 A1 | 5/2020 | Borchersen |

\* cited by examiner

MONITORING LIVESTOCK

This application claims the benefit under 35 USC 119 (e) of Provisional application 62/746,790 filed Oct. 17, 2018, 62/748,774 filed Oct. 22, 2018 and 62/848,942 filed May 16, 2019 the disclosures of which are incorporated herein by reference This invention relates to an apparatus for raising livestock which includes a confinement pen and more particularly to components which allow monitoring of the animals in the pen. In some arrangements this can be used for determining changes in behavior which might be associated with a change in characteristics of the animal. While the apparatus can particularly be used where the animals are raised for slaughter, the apparatus can also be used for animals can be raised for milk or eggs.

The arrangement herein is primarily designed for use with pigs and poultry production where the animals are typically very tightly confined in an indoor barn but can be used for any animal husbandry. The term "animal" is of course intended to include poultry.

Hog production and poultry production has typically been carried out where the animals are typically very tightly confined in an indoor barn. Skilled workers have to date managed the animals by observation and controls. However it is desirable to provide technological assistance to identify and monitor the animals and their activities including feeding.

SUMMARY OF THE INVENTION

It is an object of the present invention to provide an apparatus for raising livestock which includes an arrangement for monitoring the animals and their activities.

According to a first aspect of the invention there is provided an apparatus for raising livestock comprising:

at least one first confinement pen defining a confinement area in which a group of members of the livestock are contained;

a camera system including one or more image generating cameras, the camera system being mounted at the confinement area and arranged to obtain one or more images of all parts of the confinement area in which the members of the group of livestock may enter;

the camera system being arranged to repeatedly obtain said one or more images so that all of the members of the group of livestock in the confinement area are visible in said at least one image at all times;

and a processor for analyzing the images;

wherein the processor uses the images to continually track each of the members and distinguish each member from the other members.

This arrangement is therefore particularly designed for use in a barn where the animals are held together in groups rather than in individual pens.

In this arrangement one important independent features is that the processor is arranged to allocate to each of the members of the group of livestock in said one or more image an individual designation. The individual designation is preferably arbitrary so as to be independent of any physical or identification markings of the members of the group of livestock. Preferably the processor continually tracks each of the members and distinguishes each member from the other members by watching and tracking all members at all times. That is preferably the processor operates to generate data relating to movements of the individual members without having to mark or identify the individual members.

In this arrangement one important independent features is that the processor is arranged to use periodically data from an outside system that identifies the members to check and confirm that a member is correctly identified. Thus, in the event that a confusion between two members is detected, the processor can operate to identify which members have been confused and reallocate the data collected to those respective members.

In this arrangement one important independent features is that the processor operates to check and confirm when the member is at a specific location in the confinement pen such as a feeding station.

In this arrangement one important independent features is that the processor is arranged to provide an indication on a display device to a worker identifying a specific designated member. For example the processor may provide an indication to the worker by defining an identification number. Alternatively the processor may provide an indication to the worker by indicating to the worker in which pen of a plurality of pens forming the confinement area the member is located so that the worker is able to identify the member with his experienced eyes.

Yet further, the processor may communicate an identification of a member to a marking component that operates to mark the identified member.

Yet further, the processor may provide to the worker an interactive map of the confinement area in order to identify where an identified one of the members is located in real-time.

According to another feature of the invention there is provided an apparatus for raising livestock comprising:

at least one confinement pen defining a confinement area in which a group of animals of the livestock are contained;

a camera system including a at least one image generating camera arranged to obtain one or more images of the animals;

and a processor for analyzing the images;

a plurality of ear tags for mounting on the animals each tag having thereon a visible image which contains information for identifying the respective animal;

the processor being arranged to detect by image analysis of the image the information identifying the animal and thereby determine a location of the animal within the confinement pen.

Preferably each animal has two ear tags each tag containing the image for identifying the respective animal but system using only one tag can be suitable Preferably the visible image containing the information identifying the animal comprises a tag number which is readily readable by a worker in the pen. having a numerical symbol thereon or alphanumeric symbols. However QR codes and other machine readable information can be included or can be used instead of alpha numeric codes.

Preferably there is provided at least one feeder having at least one feed dispensing trough for feed and/or water within the confinement pen and wherein the processor is arranged to identify an animal at the feeder.

In this case there can be provided a control system for controlling supply of feed and/or water to the trough of an amount or content which is tailored to the animal identified by said information.

In some cases, each animal may have two ear tags each tag having the numerical symbol thereon or the alphanumeric symbols for identifying the respective animal.

Preferably the tag number is readily readable by a worker in the pen so that the number is not a bar code or other electronically decodable pattern.

According to another aspect of the invention there is provided an apparatus for raising livestock comprising:

at least one first confinement pen defining a confinement area in which a group of animals of the livestock are contained;

at least one feeder device having at least one feed dispensing trough for feed and/or water with an area for feeding one of the animals;

a camera system including at least one camera mounted at the feeder and arranged to obtain images of the feeder;

and a processor for analyzing the images;

wherein the processor is arranged to detect by image analysis of the image a quantity of feed and/or water in the feeder.

In some cases the system is used at a feeder having at least one feed dispensing trough for feed and/or water within the confinement pen and the processor is arranged to identify an animal at the feeder using the tag reading system.

In some cases there is provided a control system for controlling supply of feed and/or water to the trough of an amount or content which is tailored to the animal identified from the tag number. Although the same system can be used without such tailored feeding system.

When used at or with the feeder, the camera system can include a camera obtaining images of the trough and wherein the processor is arranged to detect by image analysis of the image a quantity of feed and/or water in the trough to determine whether the amount is within operating limits and to provide a signal in the event that the amount is outside the operating limits.

That is for example the processor can be arranged to detect by image analysis of the image a quantity of feed in the trough.

In some cases the feeder can be of the type which includes a water supply nipple for supplying water to the trough and the processor is arranged to detect by image analysis of the image whether the trough is filled with water or contains no water thus indicating a malfunction of the nipple.

In some cases when used with the feeder there is provided an animal guidance system controlling approach of the animals to the feeder so that each animal in turn is controlled by the guidance system and guided to the feeder to take feed and/or water and in this case the camera can be located to obtain images of the animal at the guidance system to read the tag to obtain the identity of the animal and if required tailor the feed to the identified animal.

In this arrangement, another important independent feature is that the processor can arranged to detect an amount of feed remaining in the trough after the particular animal has left the trough and to subtract from an amount of feed to be supplied to the trough for a next animal at the trough from an amount tailored for the next animal. That is, if a first animal chooses not to take a the supplied amount of the feed selected for that animal leaving a proportion in the trough, the system can detect that amount which remains and can deposit into the trough an amount which takes into account that remaining amount so that the next animal only receives the amount it is due to receive and not an extra amount caused by the previous animal leaving some feed. Also the amount left can be recorded and fed as an extra amount to the first animal when that animal returns to the feeder. In this way the amount of feed actually taken by the animals can be better monitored and controlled so that each animal receives the total amount over a time period to meets its requirements.

In one important independent feature, the feeder is arranged to dispense a required quantity of feed to the animal in a plurality of doses and wherein the processor is arranged to detect whether a previous dose has been taken by the animal before dispensing another dose.

Using the tag reading system, in some cases the processor can be arranged also to provide output data relating to movement of a specific identified animal within the confinement pen.

In some cases the using the tag reading system, the processor can be arranged to provide an output indicative of the animal at a given position in the pen and feed that information to a tracking system.

On example of use of the tracking system thus defined is that there can be provided a pen containing a male animal and the processor is arranged to provide an output indicative of estrus in an identified animal by detecting the frequency at which a female visits the male.

In another use of the system, the processor can also be arranged to detect by image analysis a calculated weight of the identified animal. This can be used to monitor weight gain both to determine market weight and to tailor feed to maximize feed uptake efficiency.

The systems disclosed herein can be used with feeders both of the type that have multiple spaces for feeding multiple pigs at the same time with connected troughs and single dedicated feeders typically but not necessarily used with tailored feed to the identified animal.

The tag reading can be mostly useful for animal identification around feeders and drinkers, but it could also be used at other locations for which it is desired to identify the individual animal for taking other individual decisions or get other individual data. One such application is estrus detection from monitoring the frequency at which the sow in pen housing visits the boar pen. Another example could be to simply identify the animal at a given position in the pen and feed that information to a tracking system.

Trough monitoring can also be used not only for tailoring the diet for each individual animal. It can also be used to raise alerts to workers in case a trough is empty when it should have some feed, that is the feeding system may not have worked properly. It could also be used to identify water nipple problems if the trough is full of water for instance or empty of water. These two examples could happen even in non-individual feeding settings such as with feeders that have multiple spaces for feeding multiple pigs at the same time with connected troughs.

The systems herein also disclose an apparatus for raising livestock comprising:

at least one first confinement pen defining a confinement area in which a group of members of the livestock are contained;

a camera system including one or more image generating cameras, the camera system being mounted at the confinement area and arranged to obtain one or more images of all parts of the confinement area in which the members of the group of livestock may enter;

the camera system being arranged to repeatedly obtain said one or more images so that all of the members of the group of livestock in the confinement area are visible in said at least one image at all times;

and a processor for analyzing the images;

the processor being arranged to allocate to each of the members of the group of livestock in said one or more image an individual designation;

wherein the individual designation is arbitrary so as to be independent of any physical or identification markings of the members of the group of livestock;

and wherein the processor continually tracks each of the members and distinguishes each member from the other members by watching and tracking all members at all times.

Preferably the processor operates to generate data relating to movements of the individual members entirely without having to mark or otherwise identify the individual members and to provide a system which is responsive to the identification. It will be appreciated that, even if there is a marking system used in the group to tag or mark animals, the arrangement described herein can and typically does operate without the need ever to consult that system. However in some cases the processor is arranged to use periodically data from an outside system that identifies the members to check and confirm that a member is correctly identified, as some errors can occur.

In this case, in the event that a confusion between two members is detected, the processor is arranged to identify which members have been confused and reallocate the data collected to those respective members. Thus the processor can operate to check and confirm the identification when the member is at a specific location in the confinement pen such as a feeding station.

Preferably, in order that the worker can take action on a particularly identified animal which might be sick or in estrus, the processor is arranged to provide an indication to a worker identifying a specific designated member of the group. This can be done in a number of different ways depending on the mode of operation of the system.

In one example where the system works in combination with a separate system which identifies the animals as set forth above, the processor can provide an indication to the worker by defining an identification number from the separate identification system which can be identified by the worker and the animal with that number found.

In another system the processor provides an indication to the worker by indicating to the worker in which pen of a plurality of pens forming the confinement area the member is located so that the worker is able to identify the member with his experienced eyes. In this arrangement, the total number of animals in the confinement area are separated into individual pens of a few animals so that the identification of the pen is sufficient to allow the worker to use his experience to locate the animal showing the signs of the condition detected.

In yet another arrangement, the processor communicates an identification of a member with component that operates to mark the identified member, for example at a feeding station, using a colored or visual indication marker. Thus for example a paint dabber or spray can be located at the feeder station and operated when the animal concerned is at the station.

Still further in another arrangement, the processor is arranged to provide to the worker an interactive map of confinement area in order to identify where the identified member is located in real-time.

Preferably the processor is arranged to generate for each member one or more of the following sets of data:

Position of each member which can be obtained continually in real time or can be established by repeated periodic analysis of the data to provide periodic information about the position.

Velocity of each member which again can be continuous or periodic.

Posture of different parts of the member (whole body, head, tail, etc.) which again can be continuous or periodic.

Energy level of the member which again can be continuous or periodic.

Preferably the processor is arranged to generate for a subgroup of the members one or more of the following sets of data:

Energy level of the subgroup of members which again can be continuous or periodic.

Average velocity of the subgroup which again can be continuous or periodic.

The confinement area can be, in an important independent aspect of the invention herein, subdivided into different areas including a feeding area a drinking area, a rest area and the data relating to all of the animals in these areas can be analyzed to get individual or group data for any one of these specific areas. In view of the different activities of the animals in these areas, analysis of the behavior of the animals when in these areas can reveal information about the condition of the animals which would not be determined by an analysis of their average activities when moving throughout the confinement area.

In addition, the data obtained can be, in an important independent aspect of the invention herein, used by detecting the envelope of the image or by analyzing specific marking within the image to estimate the weight from each animal with the same camera system and assign this weight to the animal that is being tracked with our system. Other metrics, in an important independent aspect of the invention herein, such as body condition, fighting marks, etc. can also be obtained. These will not be obtained from behavior metrics, but will use the same cameras to detect the envelope of the image and/or markings within the image and can also be associated to a specific animal.

The data from these analyses for each of the animals of the group can be used to detect diseases, management problems, climate control problems, reproduction events, aggression events, etc.

Preferably the confinement area comprises a pen or a set of pens in which the livestock remain contained until required to be transported for transfer as part of a purchase of the group.

Preferably the confinement pen includes one or more feeding systems so that the livestock remain contained in the pen.

Preferably the processor is arranged for analyzing the images from the confinement pens to generate a detected number or count of the livestock in the confinement area. Where the area is formed by a series of individual pens the processor is arranged for analyzing the images from the plurality of confinement pens to generate detected number of livestock in the group in each respective confinement pen and also acts to repeatedly generate inventories containing the detected number of livestock in each pen and the detected number of the total of livestock in all the pens in the confinement area so that the number of livestock extracted and the number of livestock transferred from one pen to another pen are included in the inventories.

In this way preferably the processor automatically provides an inventory of livestock removed from the pens to be extracted such as when dead of seriously ill and the number of livestock transferred from one pen to another pen and livestock added to the pens.

Preferably the inventory comprises an accounting document for use in purchase of the group.

In many cases the confinement area is larger than can be imaged by a single camera and wherein a plurality of cameras is provided with the images being integrated to allow counting of the total number of livestock in the pen.

Preferably the camera is mounted on a ceiling of the confinement area at a fixed position.

Preferably the camera is removable from its mount and communicates wirelessly so can be moved to another mount at another pen.

Preferably the processor is able to distinguish humans from the livestock.

Typically but not necessarily the livestock comprises pigs or poultry.

The arrangement described herein also can be used in an apparatus for raising livestock comprising:

a plurality of confinement pens in which groups of the livestock are contained;

an alleyway connected to and extending between the confinement pens;

so that workers are allowed to remove livestock from the confinement pens either to be extracted from the pens or to be transferred from one to another of the confinement pens;

each of the confinement pens having least one camera mounted thereat so that all of the group of livestock in the respective confinement pens can be captured on at least one image;

and a processor for analyzing the images from the confinement pens, the processor being arranged to generate an detected number of livestock in the group in each respective confinement pen;

and repeatedly generating inventories containing the detected number of livestock in each pen and the detected number of the total of livestock in all the pens so that the number of livestock extracted and the number of livestock transferred from one pen to another pen are included in the inventories.

The arrangement described herein also can be used in an apparatus for raising livestock comprising:

a confinement pen in which a group of the livestock is contained;

wherein the confinement pen comprises a pen in which the livestock remain contained until required to be transported for transfer as part of a purchase of the group;

the confinement pens having least one camera mounted thereat so that all of the group of livestock in the confinement pen can be captured on at least one image;

a processor for analyzing the images from the confinement pen, the processor being arranged to generate an detected number of livestock in the group in the confinement pen;

wherein the pen is larger than can be imaged by a single camera and wherein a plurality of cameras is provided with the images being integrated to allow counting of the total number of livestock in the pen.

The arrangement described herein also can be used in a method for raising livestock comprising:

containing the livestock in at least one pen;

removing livestock from the confinement pen either to be extracted from the pen or to be transferred to another confinement pen and adding livestock into the pen;

mounting at least one camera mounted at the pen so that all of the livestock in the confinement pens can be captured on at least one image;

analyzing the images from the confinement pen, the processor being arranged to generate an detected number of livestock in the confinement pen;

and repeatedly generating inventories containing the detected number of livestock in said at least one pen so as to automatically provide an inventory of livestock removed from the pen to be extracted and the number of livestock transferred from one pen to another pen and livestock added to the pen.

It will be appreciated that the invention herein can be expressed as a method or as an apparatus and that all definitions herein can be so expressed.

The inventions defined above can be used with one or more of the optional or further improvement features set out below and each may be used independently or in combination with any of the other features.

Preferably the portion of the alleyway comprises a full width of the alleyway.

Preferably the confinement pen comprises a pen in which the livestock remain contained until required to be transported for transfer as part of a purchase of the group.

Preferably the confinement pen includes one or more feeding systems so that the livestock remain contained in the pen. The pen may therefore be divided into separate sections of resting, feeding and waste but in the arrangement herein, the animals are visible and detected in all of the sections so that they can be tracked throughout.

In a typical arrangement the remote location to which the animals are transferred though the alleyway comprises a transport container. However the remote location can comprises another confinement pen.

Preferably the inventory comprises an accounting document for use in purchase of the group. The inventory can be printed image from the processor or may form a display on a suitable screen. However the inventory is a real thing which can be accessed and studied by the worker to provide data for management of the livestock operation.

Preferably the portion of the alleyway has a width such that the livestock can pass at least two abreast and can turn to move in an opposite direction against the direction of travel without any restriction thereto so that when counting is carried out in the alleyway the processor of the image has to take into account these different movements of the animals. Thus the animals are not confined by any part of the alleyway to movement in a single row in a single direction.

Preferably the processor includes a register which counts a first intermediate number of livestock in an initial group and continues to count the livestock from a second group to provide both intermediate numbers and a subsequent total.

Preferably the processor is arranged to generate an alarm after reaching a predetermined number of livestock.

Preferably the system allows to play back a previous counting session video for quality insurance or in case of dispute resolution.

In this case, the images can be integrated by stitching the images as one bigger image and then analyzing this image. Alternatively the images are integrated by analyzing the content of each image independently and then changing the coordinate system of the different cameras into a global coordinate system.

The arrangement herein is designed to address the recurring challenge of counting pigs and made it the first tool that automatically and reliably counts pigs without human intervention. It uses state-of-the-art computer vision algorithms to count pigs in real time without even having to think about it.

The arrangement herein provides the first artificial intelligence-powered vision system designed to help pig producers with the daily task of counting pigs. It is made of one or multiple cameras, a computation module, and a simple smartphone/tablet user interface. It can be used in corridors for automatic counting of moving pigs through a virtual line or above pens or other defined areas for instant counting or inventory purposes. The arrangement is designed to address the recurring challenge of counting pigs and made it the first tool that automatically and reliably counts pigs without human intervention. It uses state-of-the-art computer vision algorithms to count pigs in real time without even having to think about it.

The arrangement uses fixed hardwired cameras or battery-powered mobile cameras that can be easily moved from a counting area to another. It uses artificial-intelligence algorithms to analyze live video streams and returns in real-time the number of pigs moving through a virtual line or the instantaneous number of pigs in a designated area. Its simple mobile user interface allows to easily choose between dynamic counting or instantaneous counting. When in dynamic counting mode, all pigs going through a virtual line are counted positively and all pigs going back are counted negatively. Humans are not detected as pigs and are therefore not mistakenly counted as animals. Through the interface, the user can visualize the counting area and the number of pigs at any time, register intermediate numbers of pigs, set alarms to ring after reaching a certain number of pigs, and generate reports about the reception/shipment of the pigs. The system allows to play back the last counting session videos for quality insurance or in case of dispute resolution.

The arrangement herein reduces the need to handle animals for counting purposes, thus improving animal welfare and worker safety. It allows animal handlers to better focus on their work and avoid being distracted by the demanding task of counting the animals.

The arrangement herein makes the management of the farm more efficient and precise. It reduces counting mistakes that can lead to disputes between the stakeholders of the pork chain. It can also be used to monitor an entire farm and always have updated inventory numbers at hand.

Although easy to use as a standalone system, the arrangement features an open application programming interface (API) for third parties to use freely. This allows farm management software companies to easily connect the system to their own integrated solution and pig producers to seamlessly benefit from automatic real-time inventories without modifying their habits.

In accordance with another aspect of the invention there is provided an apparatus for raising livestock comprising:

a farrowing pen defining a sow confinement area for a sow and at least one piglet confinement area for piglets born from the sow;

a feeder device having at least one feed dispensing trough for feed and/or water to the sow;

a camera system including at least one camera mounted at the farrowing pen and arranged to obtain images of the farrowing pen including the sow confinement area and said at least one piglet confinement area;

a processor for analyzing the images;

and an output communication system for communicating to a worker data related to information obtained from the images.

In one important embodiment the processor is arranged to obtain from the images data related to birth of piglet and to provide said data to the output communication system. This can be carried out where the data is obtained by observing in the image the presence of piglets in the farrowing pen. Alternatively the data can be obtained by detecting changes in positions and/or demeanour of the sow in the farrowing pen.

In one important embodiment the processor is arranged to detect by image analysis of the image a quantity of feed and/or water in the feeder.

In one important embodiment the processor is arranged to calculate from the images and provide to the worker a body condition score of the sow repeatedly during a period of residence of the sow in the farrowing pen. The processor can be arranged to modify an amount of feed supplied to the feeder in response to detected changes in body condition score.

In one important embodiment the processor is arranged to detect by image analysis of the image a quantity of feed and/or water in the trough to determine whether the amount is within operating limits and to provide a signal in the event that the amount is outside the operating limits.

In one important embodiment the feeder is arranged to dispense a required quantity of feed to the animal in a plurality of doses and wherein the processor is arranged to detect whether a previous dose has been taken by the animal before dispensing another dose.

In one important embodiment the processor is arranged to detect from the images a location of at least one of the piglets in a crushing position underneath the sow. The crushing location can be observed by detecting a missing one of the piglets from the image indicating that one is underneath the sow. As an alternative there can be provided a sound detector for detecting a scream from a piglet being crushed and for communicating sound data to the processor to provide an indication of a crushed piglet. In this arrangement the processor can be arranged to use both the sound data and image analysis of the images for providing a determination of a crushed piglet. Also the processor can be arranged to use the sound data to trigger an analysis of an image to determine the crushing of a piglet.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
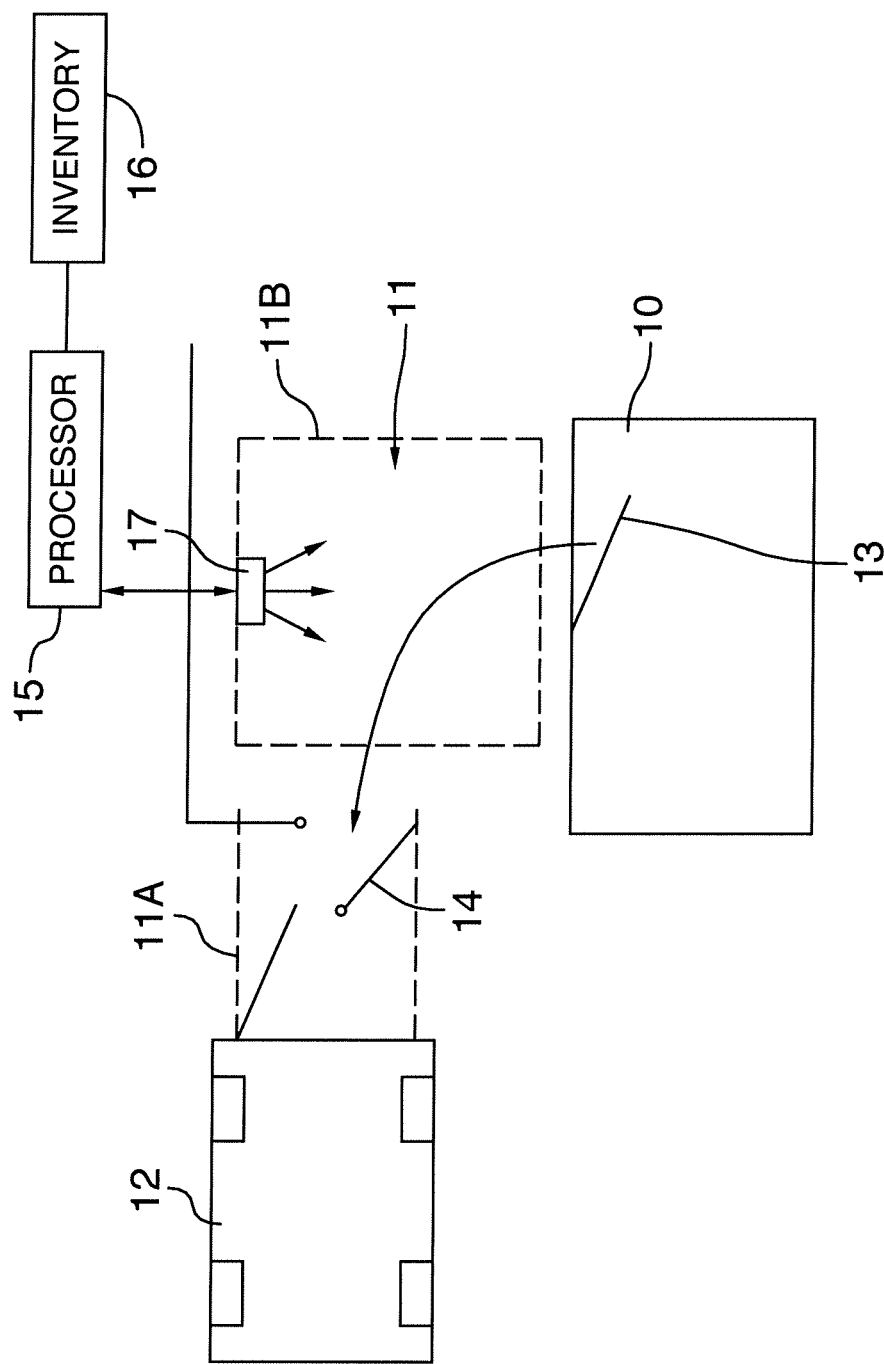
FIG. 1 is schematic plan illustration of a first embodiment of an apparatus according to the present invention.

FIG. 1 shows an apparatus for raising livestock for slaughter with a first confinement pen 10 in which a group of the livestock are contained and an alleyway 11 for transferring the group of livestock between the confinement pen 10 and a transport container in a direction of travel therebetween.

The alleyway is typically relatively complex with doorways 13 and 14 into the pen itself and between the alleyway and the exterior of the building where the transport container is located. The alleyway can include exterior components 11A outside the doorway 14 to direct the animals to the container 12.

It will be appreciated that in some cases the animals are directed from the container 12 to the pen depending on whether the animals are being delivered to a finishing location or from that location to market. The system can also be used to count animals going out of a breeding farm. Then the same animals can be counted again when going into a finishing location.

The alleyway has a width such that the livestock can pass at least two abreast and can turn to move in an opposite direction against the direction of travel. That is the alleyway is designed to allow transportation of various equipment so that its dimensions are determined by the requirements rather than as a single path for single animals to move to the container 12. Thus the animals which are very nervous at this time can be moving in all directions and can turn and run back if sufficiently troubled.

In order to provide the counting system, a camera 17 is mounted at the alleyway to obtain images of a portion 11B of the alleyway or of the whole alleyway including any livestock in the alleyway.

A processor 15 is provided for analyzing the images, the processor being arranged by the method disclosed below to generate an detected number of livestock in the group which have moved through the alleyway when the group has completed the movement from the confinement pen to the remote location.

The processor takes into account livestock which are side by side and livestock which are moving in the opposite direction before all livestock of the group complete their movement between the confinement pen and the remote location. An output from the processor 15 is provided to and entered into an inventory 16 so that the detected number previously calculated is recorded.

The processor operation goes as follows:

Each animal is detected in a first frame of the video stream with the help of a deep neural network (could be a different type of model or algorithms in the future). A bounding box is drawn around each detected animal in the image. For counting animals in pens, we simply report the number of animals detected or the average over a few frames. For counting in a corridor, continue to the next steps.

Each animal is detected in the second frame as for the first frame.

The algorithm statistically determines which animal bounding box detected in the second frame is the most likely associated to each animal bounding box of the previous frame. This association can be based on previous knowledge about animal speed and acceleration, bounding box size (related to animal size), similarity between animals, among others. Once association is made, we trace a line between the center of the first bounding box and the center of the second.

We repeat the process for subsequent frames and keep track of the different positions of each individual animal where the positions are taken as center of the bounding boxes which represents in effect the center of mass of the animal.

That is the systems herein follow the position of a particular animal which is selected in a first image and then tracked throughout its movement through the system. In this way it is not necessary to individually identify the animals by tags or numbers or other identifying marks since the actual identity of the animal concerned is not important, just that a single selected animal be tracked through its movement.

One or several virtual counting lines are positioned perpendicular to the direction of the animals (corridor). Each animal track that crosses a counting line in the direction of counting adds 1 to the counter. Each animal track that crosses a counting line in the opposite direction removes 1 from the counter. We can use several parallel counting lines such that if a problem happens in previous parts of the algorithm, resulting in an error in the count, it is likely that this problem will not affect other counting lines.

We statistically choose the final count based on the different counting lines. Different strategies such as maximum, average, democratic vote or others can be used to get the number of pigs from the result of the counting lines.

Processing can be done in real time or not. We prefer in real time but could also be done a posteriori.

Explained method is a currently preferred algorithm. Other algorithms can be used. We could for instance find a way to track the animals directly without detecting them before.

If the area to be monitored is larger than the field of view of a single camera, a plurality of cameras can be arranged to cover the whole area. In that case, an algorithm will take care of integrating the different images such that their content is considered to be from a single image. This can be done by stitching the images as one bigger image and then analyze this image (animal detection) or by analyzing the content of each image (animal detection) independently and then changing the coordinate system of the different cameras into a global coordinate system to perform the next steps.

Figure 2:
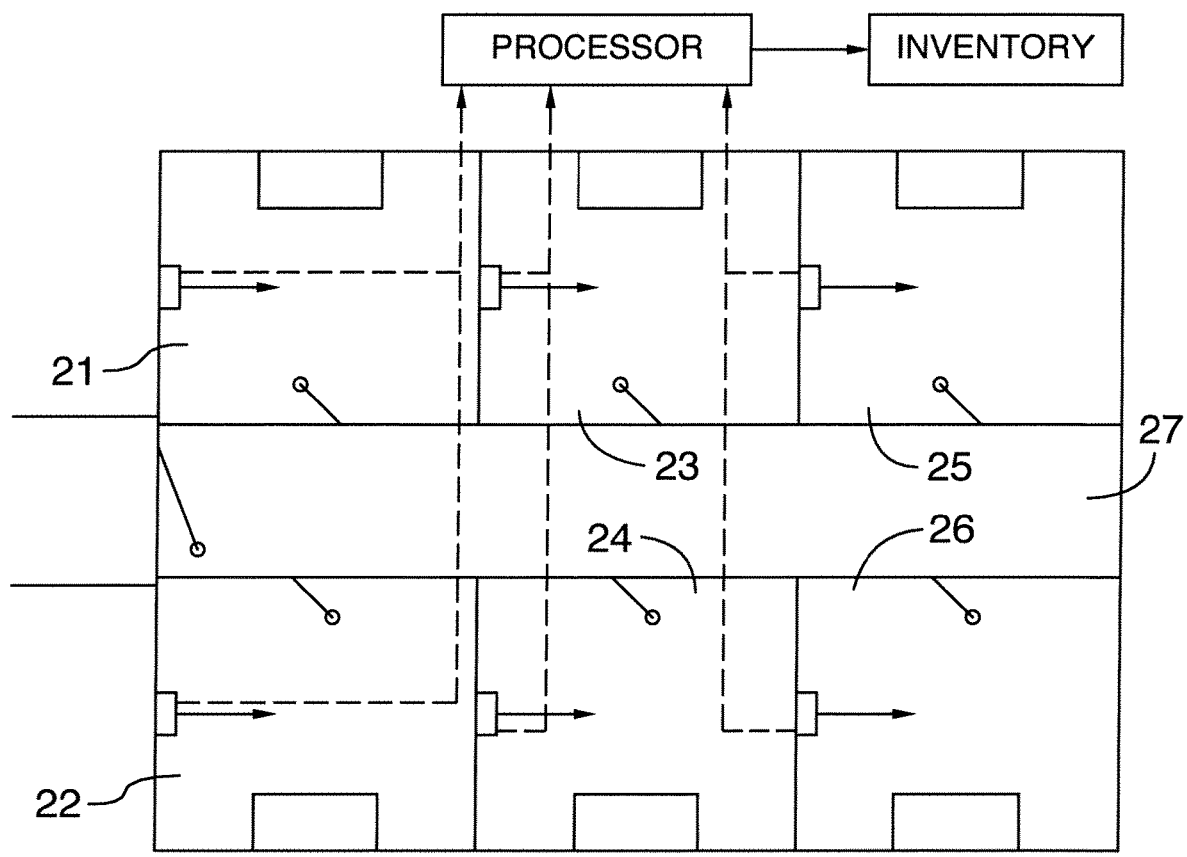
FIG. 2 is schematic plan illustration of a second embodiment of an apparatus according to the present invention.

In FIG. 2 is shown a modified apparatus for raising livestock for slaughter which includes in a barn 20 a plurality of confinement pens 21 to 26 in which groups of the livestock are contained. An alleyway 27 is connected to and extends between the confinement pens so that workers are allowed to remove livestock from the confinement pens either to be extracted from the pens to be discarded outside the barn in the event of death or severe illness or to be transferred from one to another of the confinement pens.

In order to keep an accurate track of removals and transfers, a counting system is provided which repeatedly generates inventories containing the detected number of livestock in each pen and the detected number of the total of livestock in all the pens so that the number of livestock extracted and the number of livestock transferred from one pen to another pen are included in the inventories. The inventory is therefore adjusted according to the animals seen in the pens only. This system can use cameras only in pens without imaging in the alleyways. However imaging in the alleyways to obtain also direct information on the transfers.

This is done by providing in each of the confinement pens least one camera 17 so that all of the group of livestock in the respective confinement pens can be captured on at least one image and the processor 15 for analyzing the images from the confinement pens, the processor being arranged to generate an detected number of livestock in the group in each respective confinement pen.

Figure 3:
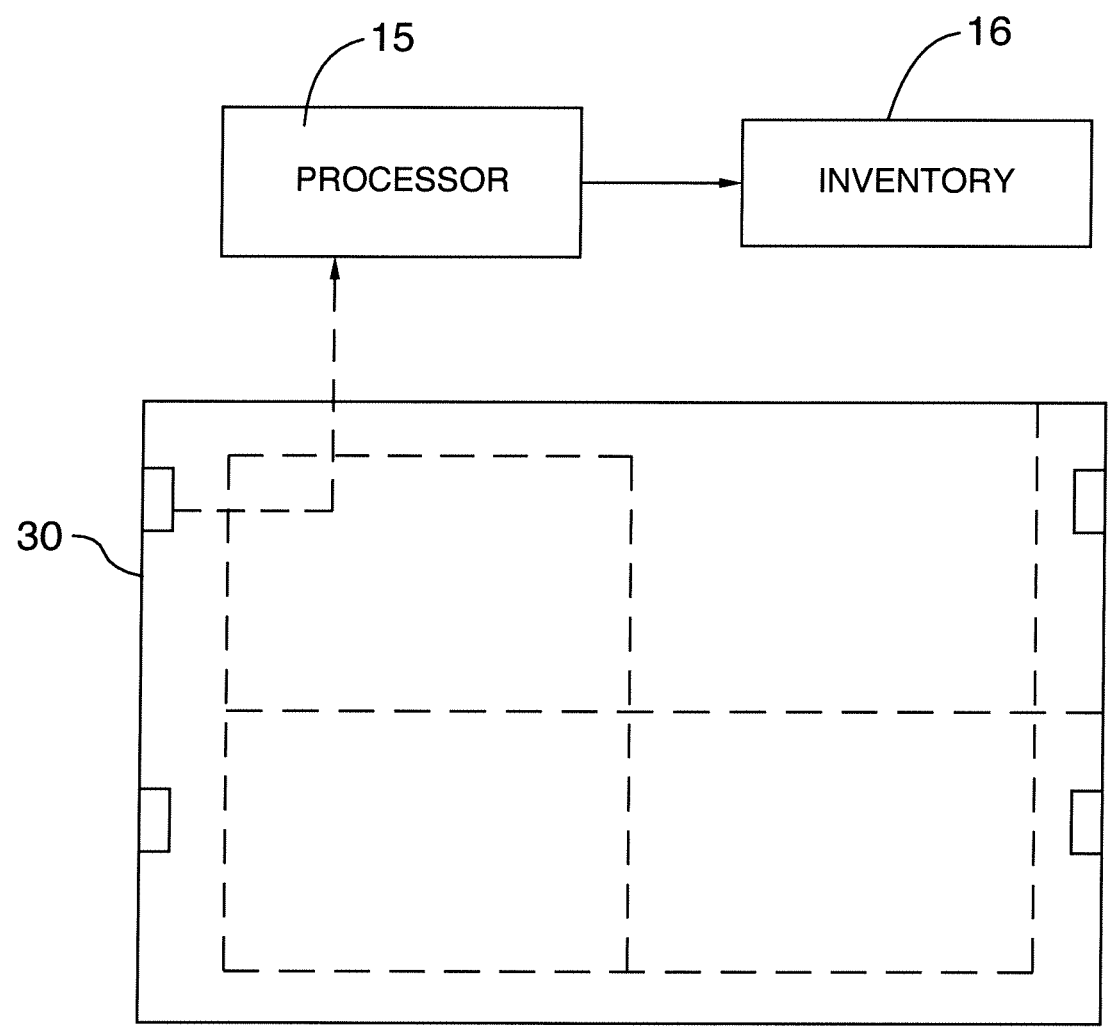
FIG. 3 is schematic plan illustration of a third embodiment of an apparatus according to the present invention.

In FIG. 3 is shown a modified apparatus for raising livestock for slaughter which includes a barn 30 defining one large confinement pen in which a group of the livestock is contained. This arrangement is typically used for poultry where the whole barn is filled with one batch and the livestock in the batch remain contained until required to be transported for transfer as part of a purchase of the group or for dead animal removal. In this arrangement the pen is larger than can be imaged by a single camera and hence a plurality of cameras is provided with the images being integrated to allow counting of the total number of livestock in the pen.

Figure 4:
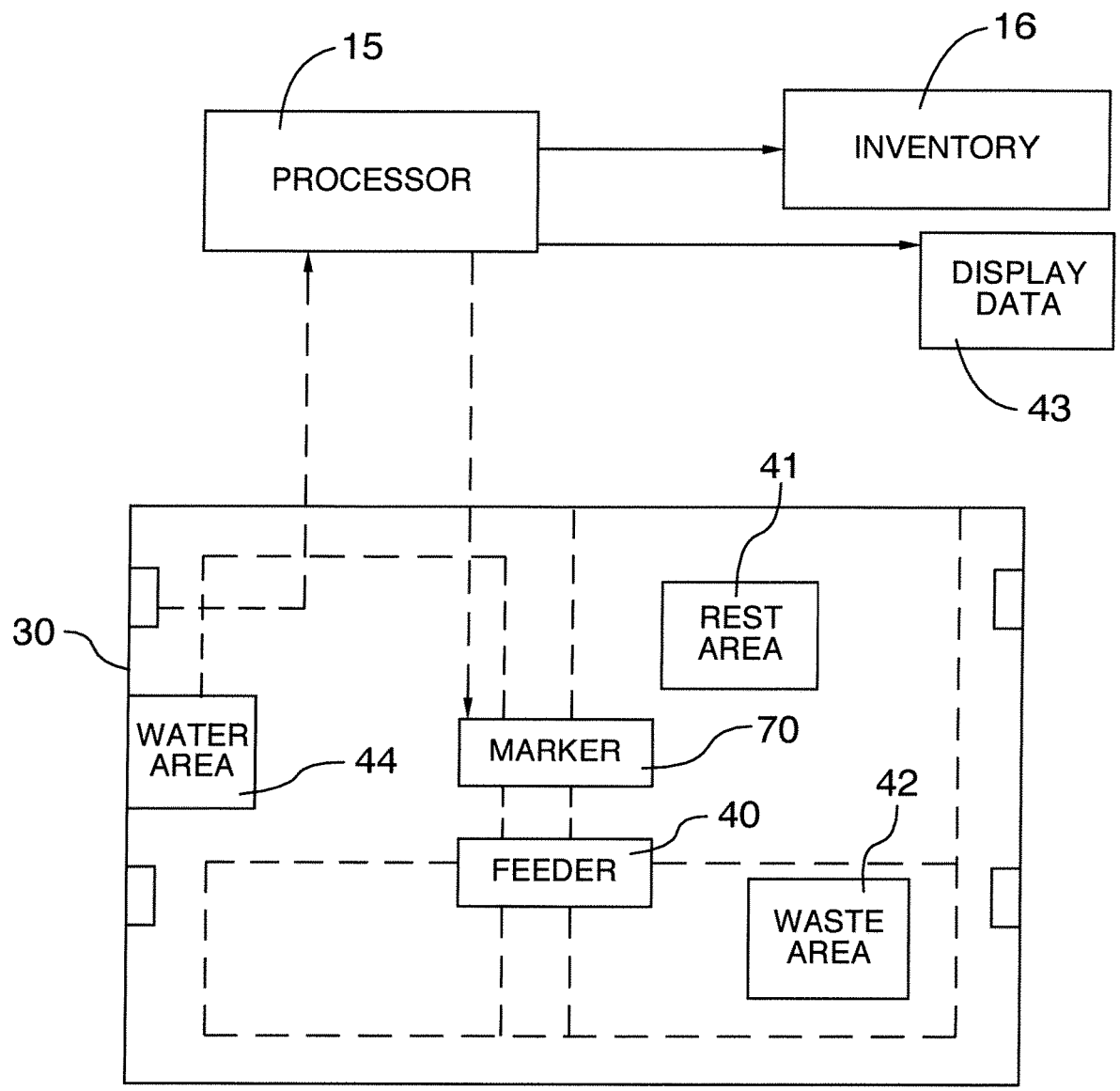
FIG. 4 is schematic plan illustration of a fourth embodiment of an apparatus according to the present invention.

In FIG. 4 is shown a modified version of the apparatus of FIG. 3 for raising livestock which includes the barn 30 or confinement area. This may be a single area or may be separated into individual pens each containing a portion of the total number of animals being raised and being monitored by the system herein.

Each pen or the single common pen typically includes a feeder system 40, a rest area 41, a waterer 44 and a waste area 42 where the animals move from one area to another at their own volition. The processor 15 in this embodiment not only provides an indication of the inventory or count of the number of animals in the confinement area but also a display device for displaying the data obtained by the system as discussed hereinafter.

Figure 5:
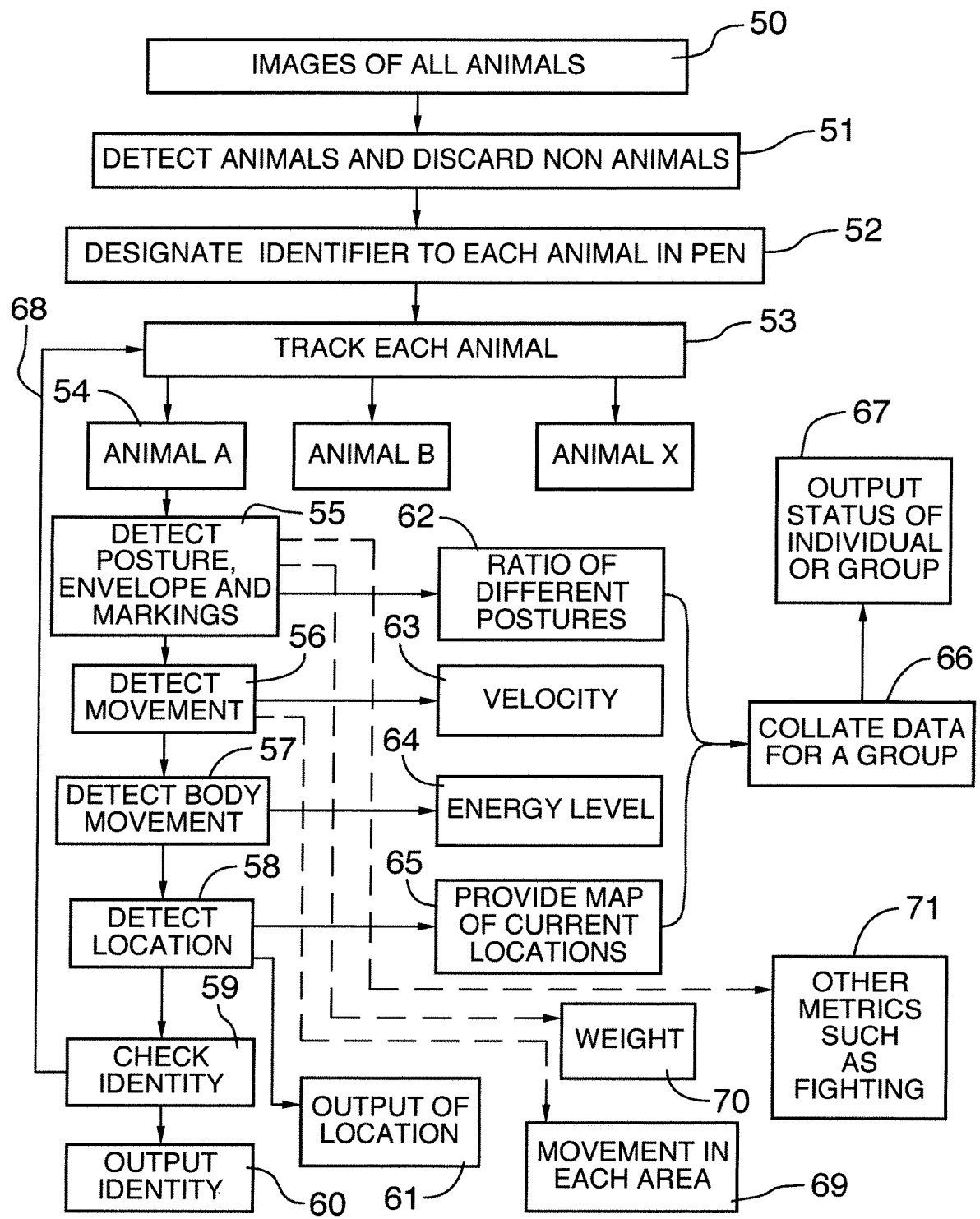
FIG. 5 is a flow chart showing the operation of the processing system in schematic form.

The operation of the processing system is shown in schematic form in FIG. 5. In this operation, the processor receives the stream of images of the whole confinement area as indicated at 50. At step 51, the processor analyzes the total image firstly to discard or ignore non-animal components such as stationary objects and humans in the area.

After identifying each of the animals in the area, each is allocated or designated an arbitrary identifier as indicated at 52. As stated above, this is not dependent on an actual marker or tag or other identifier on the animal itself but is allocated arbitrarily by the system so that each animal has its own identifier which remains with the image of the animal as it is tracked but is independent of anything associated with the actual animal.

As shown at step 53 the processor continually tracks each of the animals and distinguishes each animal from the other animals by watching and tracking all animals at all times. Thus the tracking of the animals is indicated for animal A at 54 and for each of the other animals as Animal B to Animal X.

Looking only at Animal A, while of course the same process is followed for each of the other animals but not shown, the processor operates at step 55 to generate data relating to posture of the animal including lying and standing but also other postures.

Again in respect of Animal A, the processor operates at step 56 to generate data relating to movements of the individual members from one location to another.

Again in respect of Animal A, the processor operates at step 57 to generate data relating to body movements of the individual animals either while stationary or during travelling movements.

Again in respect of Animal A, the processor operates at step 58 to generate data the specific location of the individual animal.

All of these operation are carried out using the processing steps defined above where the envelope and center of mass of the animal are detected and applied to the image of the area following which changes in the location of the envelope provide the above data and changes in shape of the envelope provide data on the body movements.

At step 59, when an external system is used which actively applies a mark or identification to the animal, the processor can be arranged to use periodically data from that outside system that identifies the members to check and confirm that the animal being tracked remains consistent and is correctly identified. That is some errors can occur occasionally where two animals pass very close or lie very close and then the system confuses one for the other. This can be periodically checked if an outside identification system is available since, the arbitrary allocation by the present system can be checked with the actual identifier system of the outside system at times when the location of the animal concerned can be confirmed such as at the feeding station 40. As shown at 68, when an identification error is detected, the information is fed back to the tracking step 53 to re-allocate the correct identity to the two confused animals so that their own properly allocated movements can be tracked as in steps 55, 56, 57 and 58.

As set forth above, the data detected can be used at steps 62, 63 and 64 to generated from the raw data of the animal, data related to the ratio over a time period of different postures such as standing or lying, the velocity of the animal at any time, the amount of energy being expended by the animal due to body movements and translation movements. Also the system at step 65 can generate at any time a map of the current locations of all of the animals. At steps 60 and 61 the system takes the calculated identity and current location of an individual animal which is then displayed at output display to the worker as indicated at 43.

Thus the display 43 is used by the processor to provide an indication to a worker identifying a specific designated animal for the worker to carry out a required process on that animal depending on the condition detected from the above analysis steps. This can be done by providing an indication to the worker by defining an identification number when this is obtained from the above outside identification system.

Alternatively the step 61 can be carried out simply where the processor provides an indication to the worker by indicating to the worker in which pen of a plurality of pens forming the confinement area the member is located so that the worker is able to identify the member visually since the condition identified is typically readily visible to the trained worker who is instructed where generally to look for the animal concerned.

As a further alternative the processor communicates an identification of a member with component 70 that operates to mark the identified animal, for example at the feeding station 40. That is the feeding station can require individual animals to stand at the station in a predetermined orientation while feeding so that when the identified animal reaches that location, it can be marked without confusion with other animals.

As a further alternative, the processor is arranged to provide to the worker an interactive map at step 65 of the confinement area in order to identify where the identified animals are located in real-time. This allow the worker to visually identify the animal to be extracted.

Thus as shown at steps 61 to 64 the processor is arranged to generate for each member one or more of the following sets of data:

Position of each member at any instant t.
Velocity of each member at any instant t.
Posture of different parts of the member (whole body, head, tail, etc.) at any instant t.
Energy level of the member at any instant t.

Also as shown at step 66, the processor is arranged to generate for a subgroup of the animals one or more of the following sets of data:

Energy level of the subgroup of members at any instant t.
Average velocity of the subgroup at any instant t.

Using the above obtained data, the processor is arranged so that the data is used to detect diseases, management problems, climate control problems, reproduction events, aggression events, etc which can then be communicated to the worker to take action which may be carried out on the group as a whole or may require individual animal identification as set out above.

As shown in FIG. 4, the confinement area can be subdivided into different areas including a feeding area a drinking area and a rest area and the data relating to all of the animals in these areas can be analyzed as indicated at to get individual or group data for any one of these specific area. In view of the different activities of the animals in these areas, analysis of the behavior of the animals when in these areas can reveal information about the condition of the animals which would not be determined by an analysis of their average activities when moving throughout the confinement area.

In addition, the data obtained by detecting the envelope of the image or by analyzing specific marking within the image as shown at step 55. This can be used as indicated at step 70 to estimate the weight from each animal with the same camera system and assign this weight to the animal that is being tracked with the system. Other metrics such as body condition, fighting marks, etc. can also be obtained at step 55. These will not be obtained from behavior metrics, but will use the same cameras to detect the envelope of the image and/or markings within the image and can also be associated to a specific animal. These are then used at step 71 to output information from the data obtained including indications of fighting and aggression.

Figure 6:
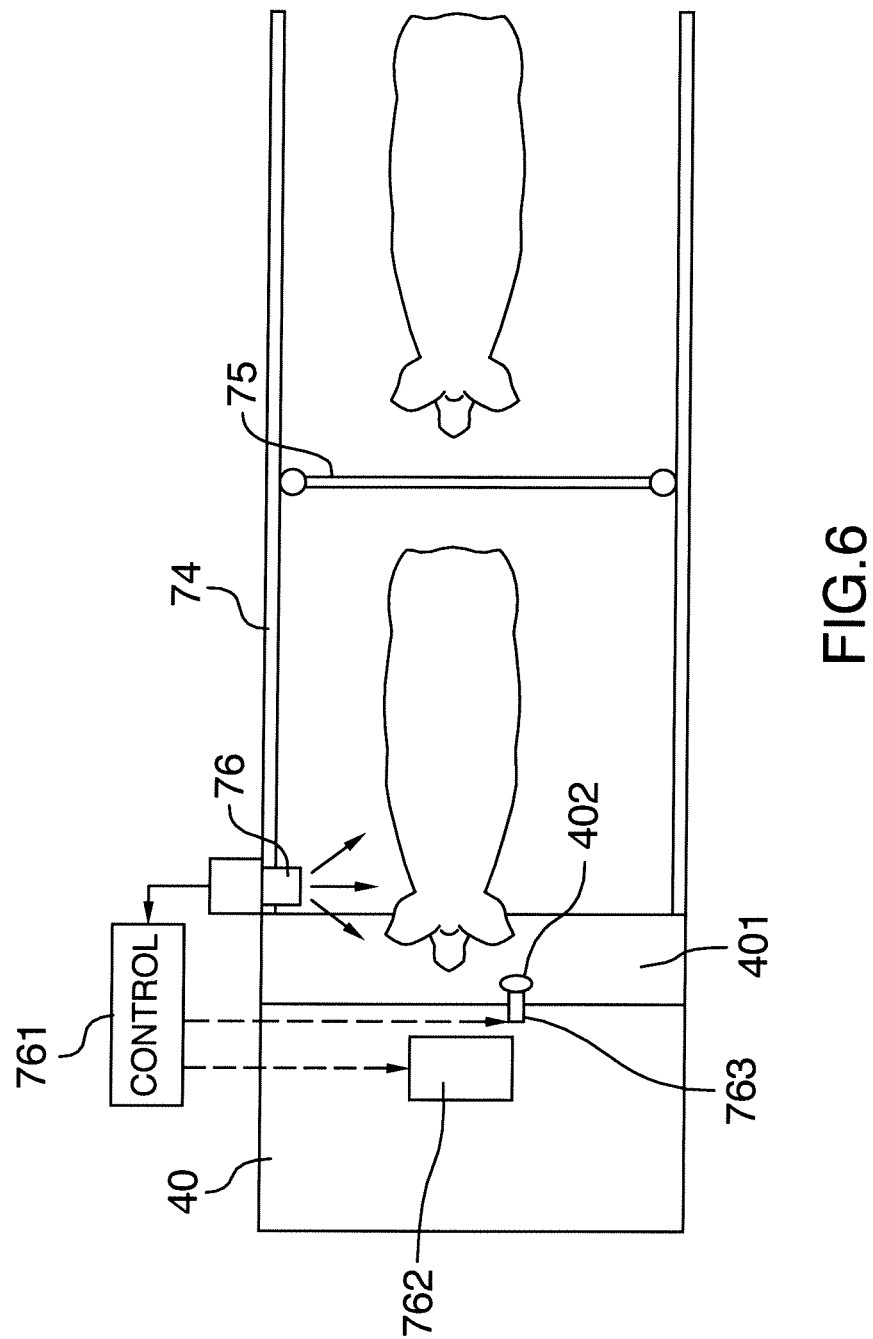
FIG. 6 is a plan view of a feeder of the type where the animals are guided to a single stall type feeder in an orderly line up allowing the stall to be used to tailor feed to the identified animal.
Figure 7:
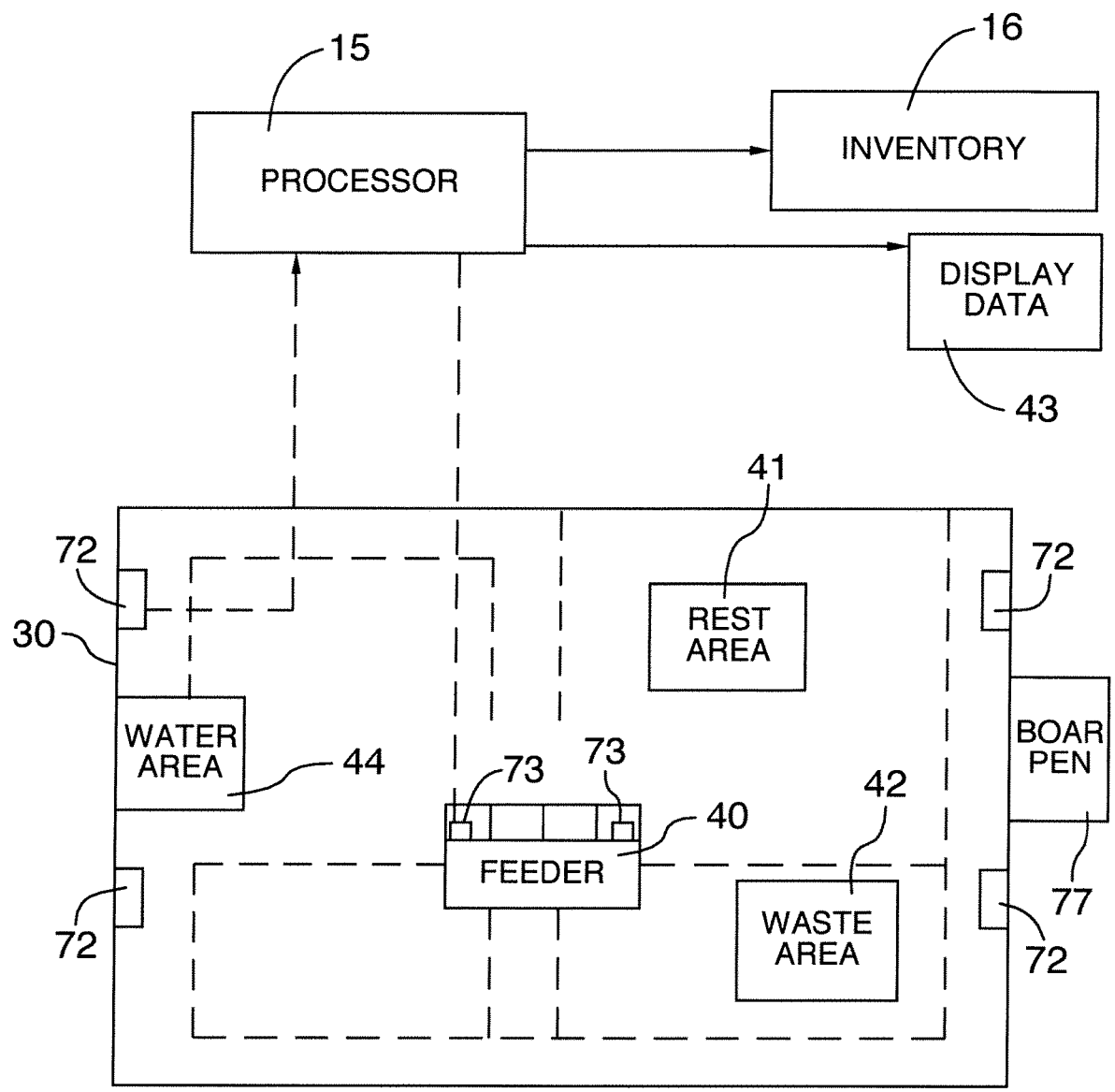
FIG. 7 is a top plan view of a confinement area including the camera system of the present invention.

Turning now to the further embodiments shown in FIGS. 6 and 7, there is shown an apparatus for raising livestock which includes the confinement pen 30 defining a confinement area in which a group of animals of the livestock are contained. The camera system of the type previously described includes the cameras 72 located generally in the area of the confinement pen and cameras 73 at the feeder 40. The feeder shown in FIG. 7 is of the multi-compartment type where the animals are not individually fed but take feed at their own volition from one of the compartments when it becomes available. The feeder shown in FIG. 6 is of the type which includes a single feeder location where the animals are controlled to enter along a guidance system 74 with control gates 75 which allow one animal at a time to enter with others being confined in a line-up and prevented from interfering with the animal at the stall.

The camera system includes a at least one image generating camera and typically a series of such cameras 72, 73 and camera 76 at the stall or guidance system all arranged to obtain images of the animals.

Figure 8:
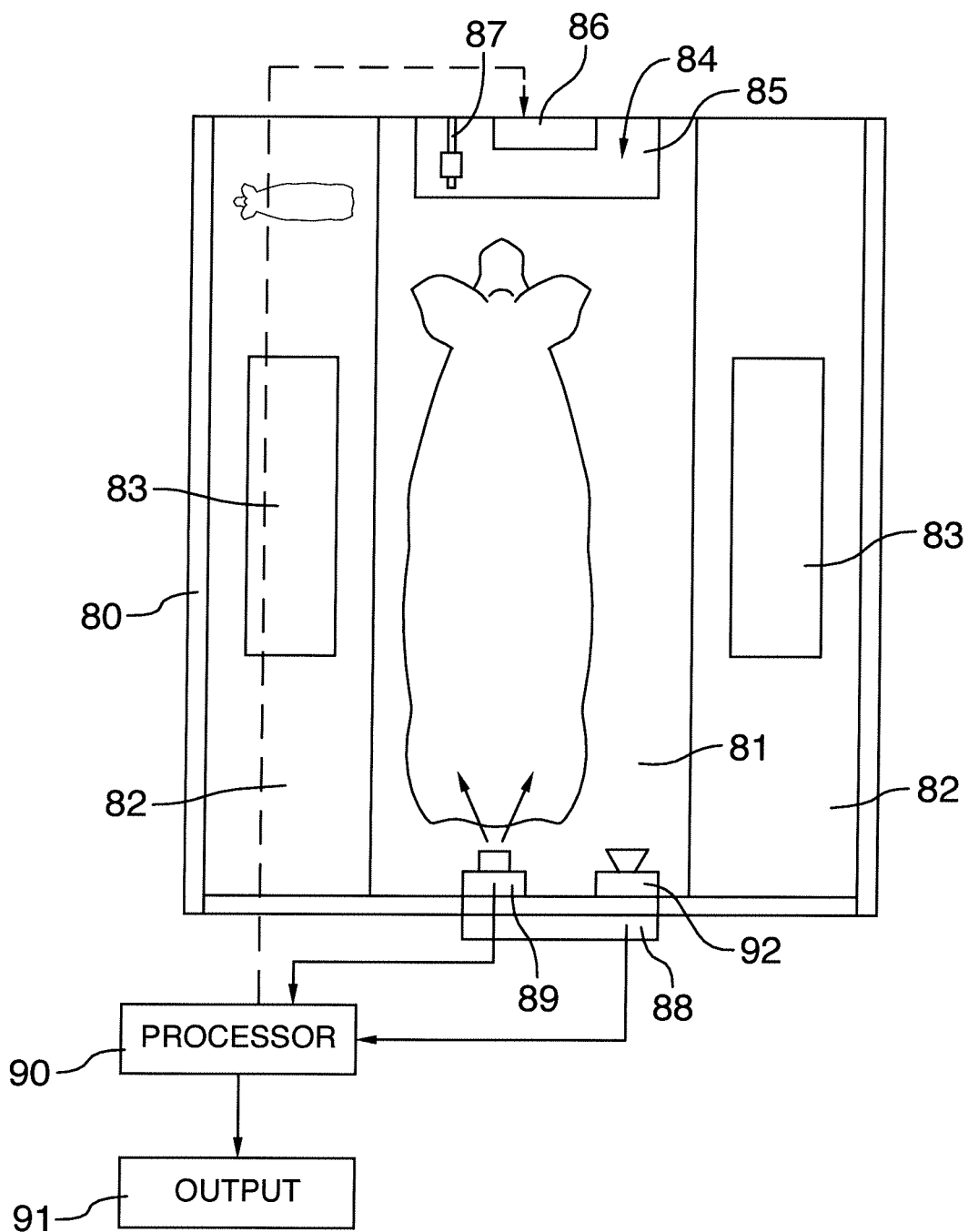
FIG. 8 is a plan view of a farrowing crate using the image analysis system of the present invention.

The system further includes the processor 15 for analyzing the images and a plurality of ear tags, one of which is shown in FIG. 8 for mounting on the animals with each tag having a visible numerical number thereon for identifying the respective animal.

The processor is arranged to detect by image analysis of the images taken at the cameras the tag number of the animal to thereby determine a location of the identified animal within the confinement pen.

Each animal has two of the ear tags shown in FIG. 8 with each tag having the same numerical symbol or alphanumeric symbols thereon for identifying the respective animal. This allows identification of the animal from either direction depending on how it is standing at the location concerned.

The use of the conventional large numbers or alphanumeric symbols on the tag allows the tag number to be readily readable also by a worker in the pen so that the worker can identify and locate a selected animal when required.

The feeder 40 has at least one feed dispensing trough 401 for feed and/or water and a water dispenser 402 for discharging water into the trough where the nipple is typically animal actuated to supply a desired amount. The feed and water are typically discharged into the same trough to be taken together but this is not essential in the present invention and the troughs may be separate or even at different locations.

In FIG. 6 there is provided a control system 761 for controlling supply of feed by a feed dispenser 762 and/or water by a valve 763 to the trough of an amount or content which is tailored to the animal identified from the tag number with the feeder control system incorporating or being part of the system which identifies the animals from the tags or from their image as previously described.

The processor is arranged to detect by image analysis of the image a quantity of feed and/or water in the trough to determine whether the amount is within operating limits and to provide a signal in the event that the amount is outside the operating limits. One particularly important aspect is that the processor is arranged to detect by image analysis of the image a quantity of feed in the trough to ensure that the system is not empty or mis-functioning. Another key feature is used where the water supply is by way of an animal actuated nipple for supplying water to the trough where the processor is arranged to detect by image analysis of the image whether the trough is filled with water indicating a malfunction of the nipple itself or one or more of the animals introducing too much water as an entertainment rather than a feeding process. That is the presence of too much water can cause the remaining animals to stop feeding which should be corrected as soon as possible with the present water detection system allowing the worker to take action from a warning signal from the system.

In FIG. 6, the feeder includes the animal guidance system controlling approach of the animals to the feeder so that each animal in turn is controlled by the guidance system and guided to the feeder to take feed and/or water. In this case the camera is located at a suitable position to obtain images of the animal at the guidance system or at the feeder itself since this can be used with the controller of the feeder to manage the supply to the individual identified.

In this arrangement, the processor is arranged to detect an amount of feed remaining in the trough after the particular animal has left the trough. The processor 761 then subtracts that amount from an amount of feed supplied to the trough for a next animal at the trough. That is, if a first animal chooses not to take the supplied amount of the feed selected for that animal leaving a proportion in the trough, the system detects that amount which remains and deposits into the trough an amount which takes into account that remaining amount so that the next animal only receives the amount it is due to receive and not an extra amount caused by the previous animal leaving some feed.

Also in FIG. 6, the feeder 40 is arranged to dispense by the dispenser 762 a required quantity of feed to the animal in a plurality of doses and the processor 761 is arranged to detect from the images whether a previous dose has been taken by the animal before dispensing another dose. In this way the animal takes only feed intended for that animal and the processor 761 can monitor how many doses each animal takes to ensure that over time sufficient doses are provided by topping up over time or by providing data to a worker if the animal continues to take a lower number of doses than intended.

In addition, using the whole camera system, the processor is arranged to provide output data at the display 43 relating to movement of a specific identified animal within the confinement pen. For example, the processor is arranged to provide an output at the display 43 indicative of the animal at a given position in the pen and feed that information to a tracking system.

As shown in FIG. 7 there is provided a pen 77 containing a male animal at the position and wherein the processor is arranged to provide an output at the display 43 indicative of estrus in an identified animal by detecting the frequency at which a female visits the pen 77.

The same image analysis system as described herein can also be used by processor to detect by image analysis of the image a calculated weight of an identified animal.

Turning now to FIG. 8 there is shown an apparatus comprising a farrowing pen 80 which typically is one of a row of such pens each containing a sow which is transferred to the pen when birth is expected. The pen defines a sow confinement area 81 for containing the sow and two piglet confinement areas 82 for piglets born from the sow. The piglet areas are arranged so that the sow is prevented from lying in these areas. The piglets remain in the pen from birth through to weaning when all are removed form the pen for another gestation cycle. A warmer mat or warming area 83 is provided in the piglet area or areas to attract the piglets away from the sow area to reduce the risk of crushing. A feeder 84 is provided at the front of the sow area with a trough 85 supplied by a feed supply system 86 and a water dispensing nozzle 87 is provided with a control nipple to allow the sow to take water at will. The supply system 86 is preferably arranged to supply a controlled amount of feed to the sow depending on a control program to ensure sufficient intake per day.

The system further includes a camera system 88 including at least one camera 89 mounted at the farrowing pen and arranged to obtain images of the farrowing pen including the sow confinement area and the piglet confinement areas.

There is provided a processor 90 for analyzing the images. The processor can be stand-alone or may be part of another processor carrying out other functions or may be part of a system. This communicates with an output communication system 91 for communicating to a worker data related to information obtained from the images. This processor or the system of which it is a part also communicates to the feeder supply system 86. The camera system includes a microphone 92 for receiving sounds from the farrowing crate.

The processor is arranged to obtain the images from the camera and sound from the microphone and to carry out image analysis to generate information therefrom relating to:

-a- data related to birth of piglet and to provide said data to the output communication system.

-b- the presence of piglets in the farrowing pen.

-c- changes in positions and/or demeanour of the sow in the farrowing pen indicative of imminent birth.

-d- a quantity of feed in the feeder.

-e- presence of water at the feeder.

-f- a quantity of feed and/or water in the trough to determine whether the amount is within operating limits and to provide a signal in the event that the amount is outside the operating limits.

-g- a body condition score of the sow which is obtained repeatedly during a period of residence of the sow in the farrowing pen.

-h- a location of at least one of the piglets in a crushing position underneath the sow.

-i- detecting a missing one of the piglets from the image indicating that one is underneath the sow.

-j- a scream from a piglet being crushed and for communicating sound data to the processor to provide an indication of a crushed piglet.

-k- both the sound data and image analysis of the images for providing a determination of a crushed piglet by using the sound data to trigger an analysis of an image to determine the crushing of a piglet.

The processor is arranged to provide an output to the worker either as an immediate call for action warning or as long term data of the conditions above and to modify an amount of feed supplied to the feeder in response to detected changes in body condition score.

The invention claimed is:

1. A method for generating an accurate detected number of livestock in a group comprising:
    directing the group of livestock from a confinement pen in which the livestock are contained to a remote location in a direction of travel therebetween so that, after travel is complete, all of the group of livestock have been transferred to the remote location;
    mounting at least one camera at the alleyway to obtain images of at least a portion of the alleyway including any livestock in the portion of the alleyway;
    passing the livestock through the portion of the alleyway where the portion has a width such that the livestock can pass at least two abreast and can turn to move in an opposite direction against the direction of travel;
    carrying out an analysis of the images to generate said accurate detected number of livestock in the group which have all moved through the alleyway when the group has completed the movement from the confinement pen to the remote location;
    wherein the analysis generating the accurate detected number takes into account livestock which turn in the portion of the alleyway to move in the opposite direction temporarily before continuing to complete the travel to the remote location;
    the analysis including dividing the portion into a plurality greater than two of transverse virtual counting lines which extend across the portion of the alleyway so that each one of the group, after the travel is complete, has passed through each virtual counting line along the alleyway;
    at each virtual counting line, generating a respective line total number of livestock passing through the virtual counting line by adding one to the line total number for each one of the group passing in the direction of travel and subtracting one for each one of the group passing in the opposite direction;
    generating the accurate detected number by comparing the line total numbers from the virtual counting lines;
    correcting an error in the line total number at least at one counting line by comparing the line total numbers at least at two other counting lines so that the error does not affect the line total number at said at least two other counting lines;
    and entering into an inventory or accounting document the accurate detected number.

2. The method according to claim 1 wherein the detected number is generated by using statistical analysis of the line total numbers from the virtual counting lines.

3. The method according to claim 1 wherein the confinement pen comprises a pen in which the livestock remain contained until required to be transported for transfer as part of a purchase of the group.

4. The method according to claim 1 wherein the confinement pen includes one or more feeding systems so that the livestock remain contained in the pen.

5. The method according to claim 1 wherein the remote location comprises a transport container.

6. The method according to claim 1 wherein the remote location comprises another confinement pen.

7. The method according to claim 1 wherein humans are distinguished from the livestock so that humans passing through the portion of the alleyway are not counted.

8. The method according to claim 1 wherein there is provided a register which counts a first intermediate number of livestock in an initial group and continues to count the livestock from a second group to provide both intermediate numbers and a subsequent total.

9. The method according to claim 1 wherein an alarm is generated after reaching a predetermined number of livestock.

10. The method according to claim 1 wherein a previous counting session video is played back for quality insurance or in case of dispute resolution.

* * * * *